US011477203B2

(12) United States Patent
Panag et al.

(10) Patent No.: US 11,477,203 B2
(45) Date of Patent: Oct. 18, 2022

(54) METHOD AND SYSTEM FOR INITIATING A TRANSFER OF RESOURCES

(71) Applicant: The Toronto-Dominion Bank, Toronto (CA)

(72) Inventors: Harjot Singh Panag, Brampton (CA); Kevin Wayne Faragher, Toronto (CA); Sumathi Seetharaman, Etobicoke (CA)

(73) Assignee: The Toronto-Dominion Bank, Toronto (CA)

( * ) Notice: Subject to any disclaimer, the term of this patent is extended or adjusted under 35 U.S.C. 154(b) by 134 days.

(21) Appl. No.: 16/930,421

(22) Filed: Jul. 16, 2020

(65) Prior Publication Data
US 2022/0021681 A1 Jan. 20, 2022

(51) Int. Cl.
*H04L 9/40* (2022.01)

(52) U.S. Cl.
CPC .......... *H04L 63/102* (2013.01); *H04L 63/083* (2013.01)

(58) Field of Classification Search
CPC ... H04L 63/102; H04L 63/083; H04L 9/3226; H04W 12/069
See application file for complete search history.

(56) References Cited

U.S. PATENT DOCUMENTS 7,720,762 B1 *  5/2010  Rolf ....................... G06Q 40/00
                                                              705/42
8,769,304 B2    7/2014  Kirsch
(Continued)

FOREIGN PATENT DOCUMENTS

WO         0184906      11/2001
WO    WO-2009001366 A1 * 12/2008  ............ G06Q 20/32

OTHER PUBLICATIONS

Jin Chen, "Locality Aware Dynamic Load Management for Massively Multiplayer Games," 2005, pp. 289-300 (Year: 2005).*

(Continued)

*Primary Examiner* — Luu T Pham
*Assistant Examiner* — Canh Le
(74) *Attorney, Agent, or Firm* — Rowand LLP

(57) ABSTRACT

A server comprises a communications module; a processor coupled with the communications module; and a memory coupled to the processor and storing processor-executable instructions which, when executed by the processor, configure the processor to authenticate a user via a first authentication channel; receive, via the communications module and from a computing device associated with the user, a signal representing a request to transfer a first quantity of resources; determine that the first quantity of resources is less than a first threshold associated with the first authentication channel; obtain identity data associated with the request to transfer the first quantity of resources; determine, based on the identity data, that a request to transfer a second quantity of resources has been previously initiated by the user via a second authentication channel that is different than the first authentication channel; and determine that the sum of the first quantity of resources and the second quantity of resources is less than the first threshold, and in response to determining that the sum of the first quantity of resources and the second quantity of resources is less than the first threshold, initiate the transfer of the first quantity of resources.

18 Claims, 11 Drawing Sheets

(56) References Cited

U.S. PATENT DOCUMENTS

| | | | |
|---|---|---|---|
| 2002/0087428 A1 | 7/2002 | Kaisha | |
| 2018/0182044 A1* | 6/2018 | Iannace | G06Q 30/0205 |
| 2018/0294966 A1* | 10/2018 | Hyun | H04L 9/3226 |
| 2019/0116192 A1* | 4/2019 | Singh | H04L 63/1441 |
| 2019/0312880 A1* | 10/2019 | Shah | H04L 67/55 |
| 2019/0370781 A1* | 12/2019 | Van Os | G06Q 20/322 |
| 2021/0382724 A1* | 12/2021 | Rudin | G06Q 50/01 |

OTHER PUBLICATIONS

Nimit Jain, "A Blockchain-Based distributed network for Secure Credit Scoring," 2019, pp. 306-312. (Year: 2019).*

* cited by examiner

METHOD AND SYSTEM FOR INITIATING A TRANSFER OF RESOURCES

TECHNICAL FIELD

The present application relates to transferring resources, and, more particularly, to methods and systems for initiating a transfer of resources.

BACKGROUND

E-commerce systems have evolved to allow customers to purchase resources, such as precious metals, online.

Some such e-commerce systems are provided by financial institutions. For example, a financial institution may allow a user or customer to purchase precious metals such as gold, silver, etc. over the internet and may arrange to have the purchased precious metals shipped or delivered to the customer's address.

Limits may be placed on transactions that are conducted over a period of time. For example, a customer may be limited to only purchasing a certain amount or a certain value of resources within a particular day. However, since these orders are received electronically, customers may circumvent these limits by purchasing the resources using various channels.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
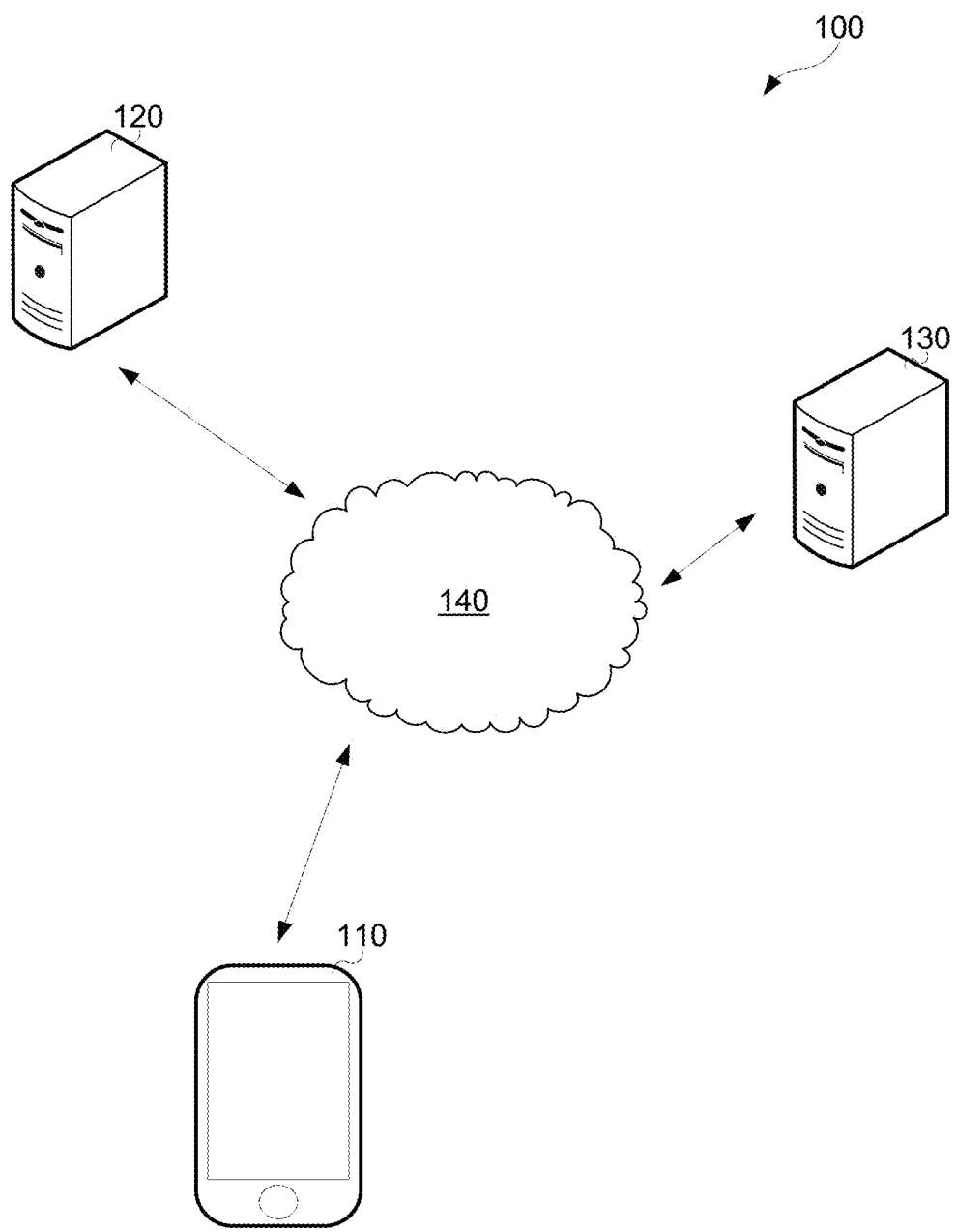
FIG. 1 is a schematic operation diagram illustrating an operating environment of an example embodiment.

Accordingly, in one aspect there is provided a server comprising a communications module; a processor coupled with the communications module; and a memory coupled to the processor and storing processor-executable instructions which, when executed by the processor, configure the processor to authenticate a user via a first authentication channel; receive, via the communications module and from a computing device associated with the user, a signal representing a request to transfer a first quantity of resources; determine that the first quantity of resources is less than a first threshold associated with the first authentication channel; obtain identity data associated with the request to transfer the first quantity of resources; determine, based on the identity data, that a request to transfer a second quantity of resources has been previously initiated by the user via a second authentication channel that is different than the first authentication channel; and determine that the sum of the first quantity of resources and the second quantity of resources is less than the first threshold, and in response to determining that the sum of the first quantity of resources and the second quantity of resources is less than the first threshold, initiate the transfer of the first quantity of resources.

In one or more embodiments, the first authentication channel includes a direct authentication channel that comprises authenticating the user based on a username and password.

In one or more embodiments, the second authentication channel does not require the username and password.

In one or more embodiments, the second authentication channel includes an indirect authentication channel that comprises authenticating the user via a digital identity network.

In one or more embodiments, the second authentication channel includes an unauthenticated channel that does not require authenticating the user.

In one or more embodiments, the processor-executable instructions, when executed by the processor, further configure the processor to determine that the sum of the first quantity of resources and the second quantity of resources exceeds the first threshold, and in response to determining that the sum of the first quantity of resources and the second quantity of resources exceeds the first threshold, initiate a transfer of a third quantity of resources that is determined as a difference between the first threshold and the second quantity of resources.

In one or more embodiments, the processor-executable instructions, when executed by the processor, further configure the processor to send, via the communications module and to the computing device, a signal causing the computing device to display a notification indicating the third quantity of resources.

In one or more embodiments, the signal causes the computing device to display a prompt requesting the user to accept or reject transfer of the third quantity of resources and wherein the transfer of the third quantity of resources is initiated in response to receiving a signal, via the communications module and from the computing device, indicating that the user has accepted the transfer.

In one or more embodiments, the processor-executable instructions, when executed by the processor, further configure the processor to determine that the second quantity of resources exceeds the first threshold, and in response to determining that the second quantity of resources exceeds the first threshold, reject the transfer of the first quantity of resources.

In one or more embodiments, the second authentication channel is associated with a second threshold that is different than the first threshold.

According to another aspect there is provided a computer-implemented method comprising authenticating a user via a first authentication channel; receiving, via a communications module and from a computing device associated with the user, a signal representing a request to transfer a first quantity of resources; determining that the first quantity of resources is less than a first threshold associated with the first authentication channel; obtaining identity data associated with the request to transfer the first quantity of resources; determining, based on the identity data, that a request to transfer a second quantity of resources has been previously initiated by the user via a second authentication channel that is different than the first authentication channel; and determining that the sum of the first quantity of resources and the second quantity of resources is less than the first threshold, and in response to determining that the sum of the first quantity of resources and the second quantity of resources is less than the first threshold, initiating the transfer of the first quantity of resources.

In one or more embodiments, the first authentication channel includes a direct authentication channel that comprises authenticating the user based on a username and password.

In one or more embodiments, the second authentication channel does not use the username and password.

In one or more embodiments, the second authentication channel includes an indirect authentication channel that comprises authenticating the user via a digital identity network.

In one or more embodiments, the second authentication channel includes an unauthenticated channel that does not require authenticating the user.

In one or more embodiments, the method further comprises determining that the sum of the first quantity of resources and the second quantity of resources exceeds the first threshold, and in response to determining that the sum of the first quantity of resources and the second quantity of resources exceeds the first threshold, initiating a transfer of a third quantity of resources that is determined as a difference between the first threshold and the second quantity of resources.

In one or more embodiments, the method further comprises sending, via the communications module and to the computing device, a signal causing the computing device to display a notification indicating the third quantity of resources.

In one or more embodiments, the signal causes the computing device to display a prompt requesting the user to accept or reject transfer of the third quantity of resources and wherein the transfer of the third quantity of resources is initiated in response to receiving a signal, via the communications module and from the computing device, indicating that the user has accepted the transfer.

In one or more embodiments, the method further comprises determining that the second quantity of resources exceeds the first threshold, and in response to determining that the second quantity of resources exceeds the first threshold, rejecting the transfer of the first quantity of resources.

According to another aspect there is provided a non-transitory computer readable storage medium comprising computer-executable instructions which, when executed, configure a processor to authenticate a user via a first authentication channel; receive, via a communications module and from a computing device associated with the user, a signal representing a request to transfer a first quantity of resources; determine that the first quantity of resources is less than a first threshold associated with the first authentication channel; obtain identity data associated with the request to transfer the first quantity of resources; determine, based on the identity data, that a request to transfer a second quantity of resources has been previously initiated by the user via a second authentication channel that is different than the first authentication channel; and determine that the sum of the first quantity of resources and the second quantity of resources is less than the first threshold, and in response to determining that the sum of the first quantity of resources and the second quantity of resources is less than the first threshold, initiate the transfer of the first quantity of resources.

Methods and systems for initiating a transfer of resources are described below. In one or more embodiments, a user may be authenticated through a digital identity network and a permissioned blockchain network may be used to provide the digital identity network. The permissioned blockchain network may only allow blocks to be written to a blockchain by nodes that are granted permission to write to the blockchain. At least some such blocks may be related to digital identity data. For example, at least some blocks may store a private secret, such as a hash of certain identity-related data. The identity-related data may be stored off-chain but the blockchain may be used to effectively provide proof of the data.

A server authenticates a user via a first authentication channel. The server receives a signal that represents a request to transfer a first quantity of resources and determines that the first quantity of resources is less than a first threshold associated with the first authentication channel. The server obtains identity data associated with the request to transfer the first quantity of resources and determines, based on the identity data, that a request to transfer a second quantity of resources has been previously initiated by the user via a second authentication channel that is different than the first authentication channel. The server determines that the sum of the first quantity of resources and the second quantity of resources is less than the first threshold, and in response to determining that the sum of the first quantity of resources and the second quantity of resources is less than the first threshold, the server initiates the transfer of the first quantity of resources.

Some or all of the above features may be provided by some embodiments.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a system 100 which may be used, for example, to initiate a transfer of resources. As shown, the system 100 includes a first computing device 110, a server 120 and a digital identity network server 130 coupled to one another through a network 140, which may include a public network such as the Internet and/or a private network.

The server 120 may be associated with an institution and may be a resource transfer server or financial institution server. The server 120 may maintain a database that includes various data records. A data record may, for example, reflect a transfer of resources. The data records may include a quantity (amount and/or value) of the resources, a type of the resources, identity data associated with a customer or user purchasing or requesting transfer of the resources, and information indicating an authentication channel used to initiate the transfer of resources. The identity data may include a name of the customer or user purchasing or requesting transfer of the resources and an address. The address may be a shipping or delivery address. A threshold defining a quantity of resources that may be purchased using each supported authentication channel within a particular time period may be stored in the database. The threshold may be defined or predefined by an administrator of the server 120.

The computing device 110 may take a variety of forms such as a smartphone, a tablet computer, a wearable computer such as a head-mounted display or smartwatch, a laptop or desktop computer, or a computing device of another type. In certain embodiments, a user may operate the computing device 110 to cause the computing device 110 to request to transfer a quantity of resources. Further, the computing device 110 may be used to authenticate the user.

The computing device 110 is adapted to present a graphical user interface that allows for communication with the server 120. For example, the computing device 110 may be adapted to send, to the server 120, a signal representing a request to transfer a first quantity of resources.

The server 120 may be adapted to authenticate a user via a first authentication channel. The server 120 may be adapted to receive, from the computing device 110, the signal representing the request to transfer the first quantity of resources. The server 120 may be adapted to determine that the first quantity of resources is less than a first threshold associated with the first authentication channel. The server 120 may be adapted to obtain identity data associated with the request to transfer the first quantity of resources. The server 120 may be adapted to determine, based on the identity data, that a request to transfer a second quantity of resources has been previously initiated by the user via a second authentication channel that is different than the first authentication channel. The server 120 may be adapted to determine that the sum of the first quantity of resources and the second quantity of resources is less than the first threshold, and in response to determining that the sum of the first quantity of resources and the second quantity of resources is less than the first threshold, initiate the transfer of the first quantity of resources.

The digital identity network server 130 is a server associated with a digital identity network. Although the digital identity network server 130 is illustrated as a single block, it may be a network consisting of numerous computer systems. For example, the digital identity network may be a blockchain network which includes a number of nodes. The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks. By way of example, the verified nodes may be associated with a driver's license bureau, a credit bureau, a government identity issuing office such as an entity registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other type of contact information.

Accordingly, at least some verified nodes may write to the blockchain. At least some of the blocks written to the blockchain may be related to identity data. The digital identity network server 130 may store identity data associated with a plurality of users. In at least some embodiments, identity data may not be included in the blockchain. Instead, the blocks may store a private secret that is related to such identity data. The private secret may act as proof to the existence of the identity data and may be used to verify the authenticity of the data. For example, in at least some embodiments, the private secret may be a hash of the identity data such that, when the identity data is provided to another system (i.e., a system apart from the verified node maintaining the identity data), it may be verified from the hash stored in a block on the blockchain.

The blockchain network may, for example, be implemented using Hyperledger Fabric, for example. It will, however, be appreciated that the blockchain network may take other forms.

Within the digital identity network, of which the digital identity network server 130 is associated, trusted partners may act as digital asset providers and digital asset consumers. In actions as a digital asset provider, a trusted member of the digital identity network may provide information about a particular user or customer to another trusted member of the digital identity network (e.g. a digital asset consumer). The requested information may be provided through the digital identity network in a blind manner such that the digital asset provider does not know the identity of the digital asset consumer and such that the digital asset consumer does not know the identity of the digital asset provider.

The digital identity network server 130 may be adapted to perform one or more operations consistent with the disclosed embodiments.

The network 140 is a computer network. In some embodiments, the network 140 may be an internetwork such as may be formed of one or more interconnected computer networks. For example, the network 140 may be or may include an Ethernet network, an asynchronous transfer mode (ATM) network, a wireless network, a telecommunications network, or the like.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
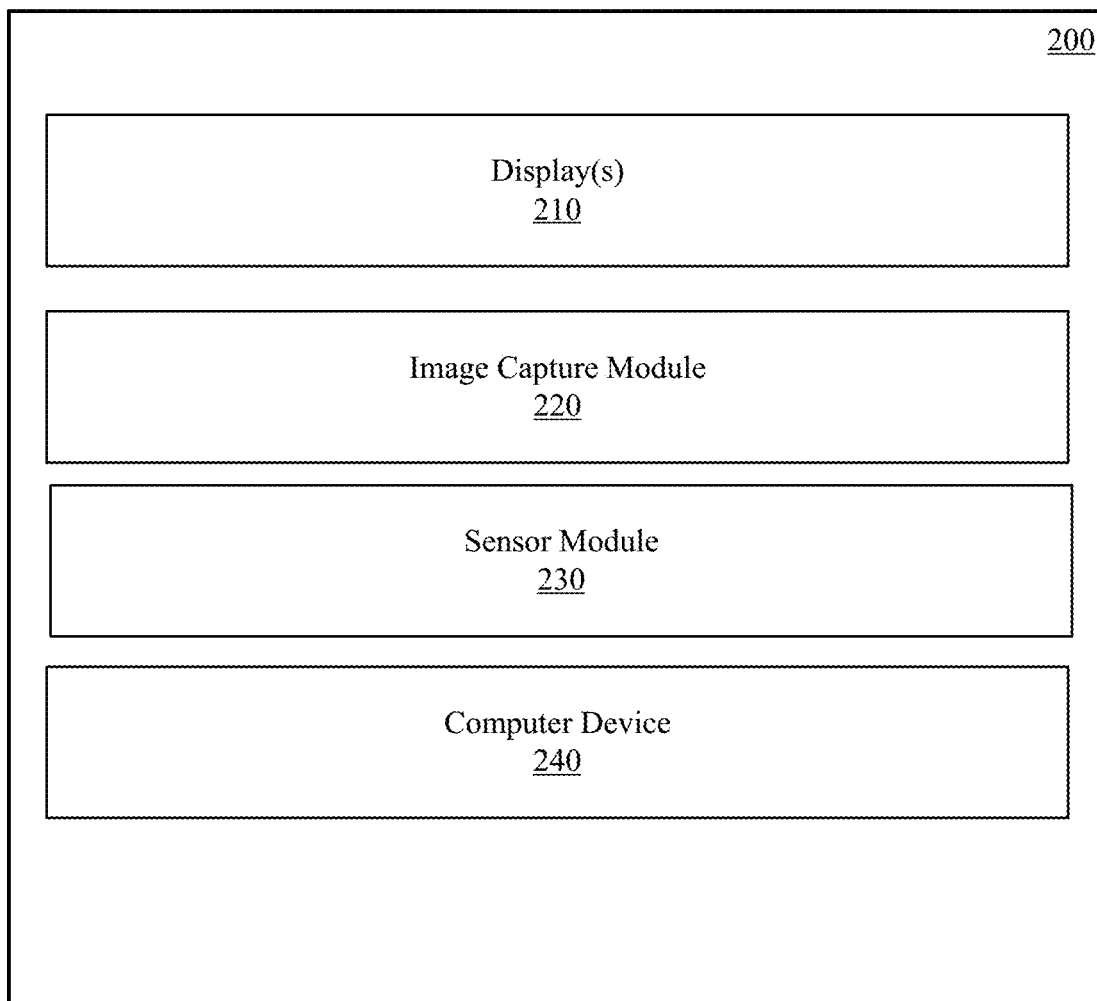
FIG. 2 is a simplified schematic diagram showing components of a computing device.

FIG. 2 is a simplified schematic diagram showing component of an exemplary computing device 200. Computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
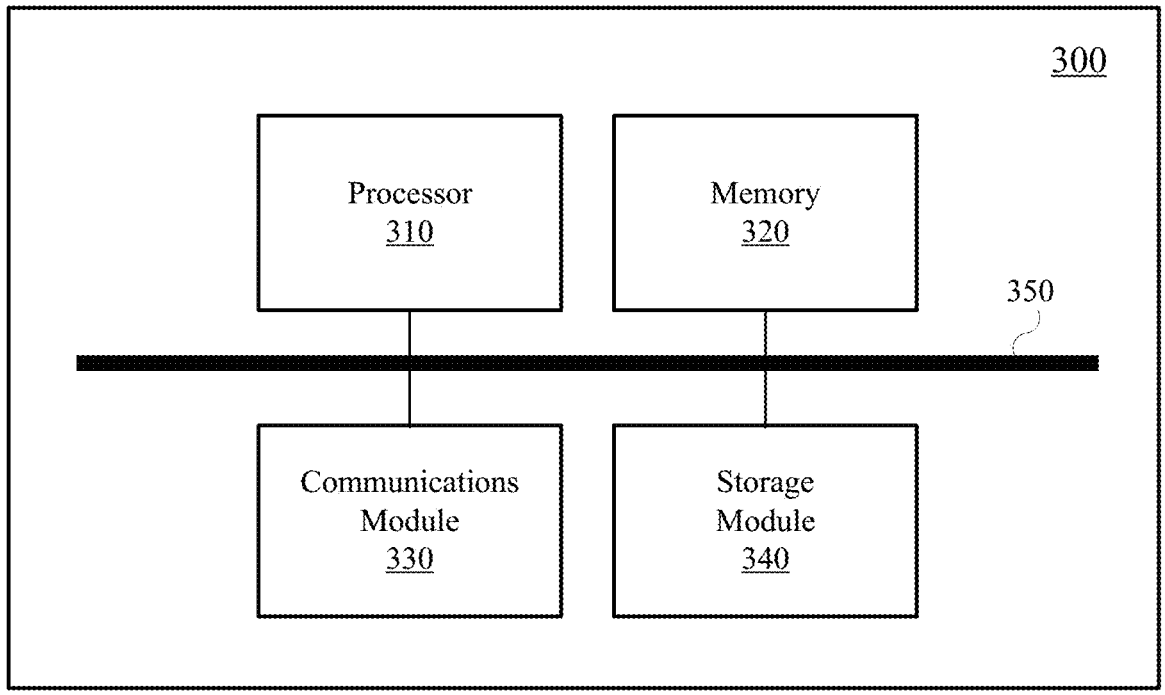
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server 120, and the digital identity network server 130 (or a node of the digital identity network).

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
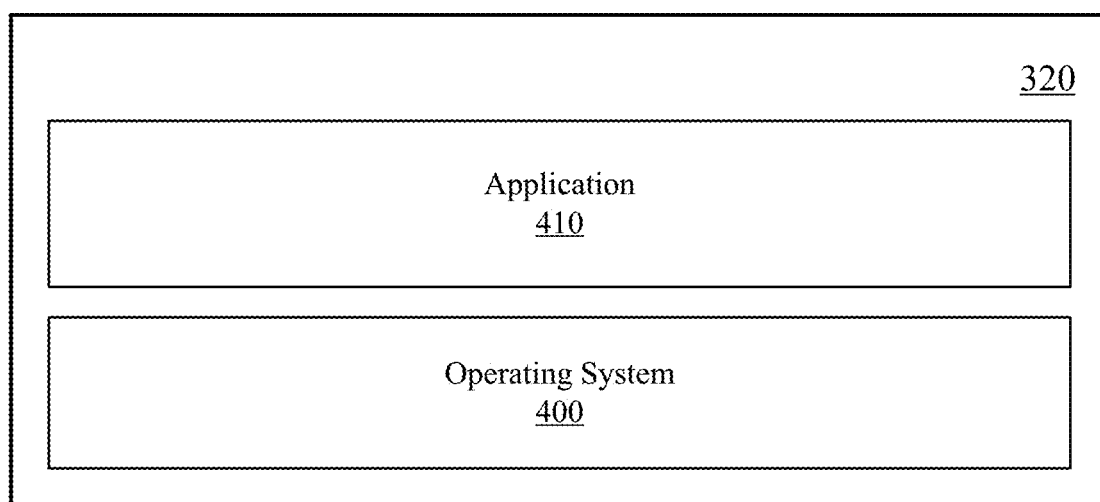
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the server 120, and/or the digital identity network server 130 (or a node of the digital identity network).

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a banking application. The banking application may be configured for secure communications with the server 120 and may provide various banking functions such as, for example, the ability to display a quantum of value in one or more data records (e.g. display balances), configure transfers of data (e.g. bill payments and other transfers), purchasing or transferring of resources and other account management functions.

By way of further example, in at least some embodiments in which the computer device 300 functions as the computing device 110, the applications 410 may include a web browser, which may also be referred to as an Internet browser. In at least some such embodiments, the server 120 may be a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure transfers of data (e.g. bill payments and other transfers), purchasing or transferring of resources and other account management functions.

By way of further example, in at least some embodiments in which the computer device 300 functions as the computing device 110, the applications 410 may include a resource transfer application. The resource transfer application may be configured for secure communications with the server 120 and may provide various resource transfer functions such as, for example, the ability to request a transfer of a quantity of resources. The request to transfer the quantity of resources may include purchasing the quantity of resources. The resource transfer application may or may not require authentication of a user prior to initiating the transfer of resources. For example, the resource transfer application may require authentication of the user through a particular authentication channel which may be based on a username and password or may include authenticated the user via the digital identity network. As another example, the resource transfer application may not require authentication of the user and as such an authentication channel such as an unauthenticated channel may be used.

By way of further example, in at least some embodiments in which the computer system 300 functions as the computing device 110, the applications 410 may include an electronic messaging application. The electronic messaging application may be configured to display a received electronic message such as an email message, short messaging service (SMS) message, or a message of another type. In at least some embodiments, the server 120 or digital identity network server 130 may be configured, through computer-executable instructions, to send a message to the computing device 110. For example, the server 120 may be configured to send a SMS message to a phone number associated with a user and an electronic messaging application on the computing device 110 may be configured to retrieve the message and display the message to the user. The message may include a link for authenticating the user.

In the following, a user is authenticated using one of a plurality of authentication channels. Each authentication channel is associated with a threshold defining a quantity of resources that may be purchased using that particular authentication channel.

When a user wishes to purchase or initiate a transfer of resources, the user may utilize an input interface (such as a keyboard and/or touchscreen) associated with the computing device 110 to cause the computing device 110 to open an application such as a mobile banking application or resource transfer application or may cause the computing device 110 to open a webpage via a web browser. Touch gestures, for example, may be used. In response, a graphical user interface (GUI) may be displayed on the computing device 110.

Figure 5:
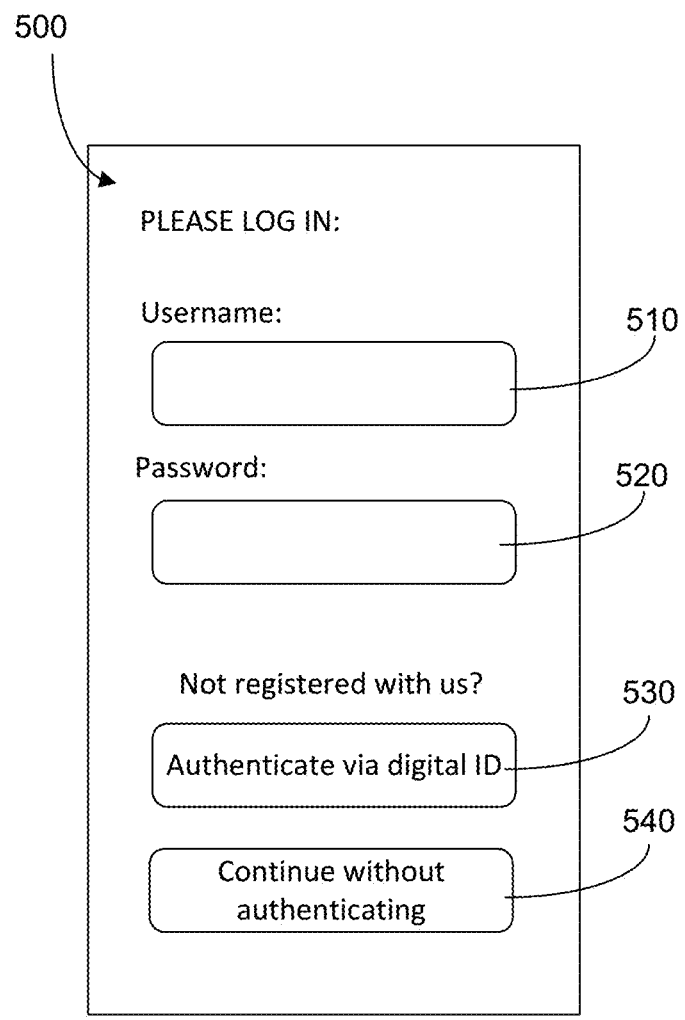
FIG. 5 is an example user interface according to an embodiment.

An example GUI 500 is shown in FIG. 5. The GUI 500 allows for manipulation of one or more input fields via the input interface associated with the computing device 110. Touch gestures, for example, may be used to complete each input field. In the example shown in FIG. 5, the GUI 500 includes a first input field 510 which is used to enter a username of the user, a second input field 520 which is used to enter a password of the user, a first selectable option 530 which is used to authenticate the user via the digital identity network and a second selectable option 540 which is used to initiate the transfer of resources without authenticating the user. Details of GUI 500 will be described in more detail below.

Figure 6:
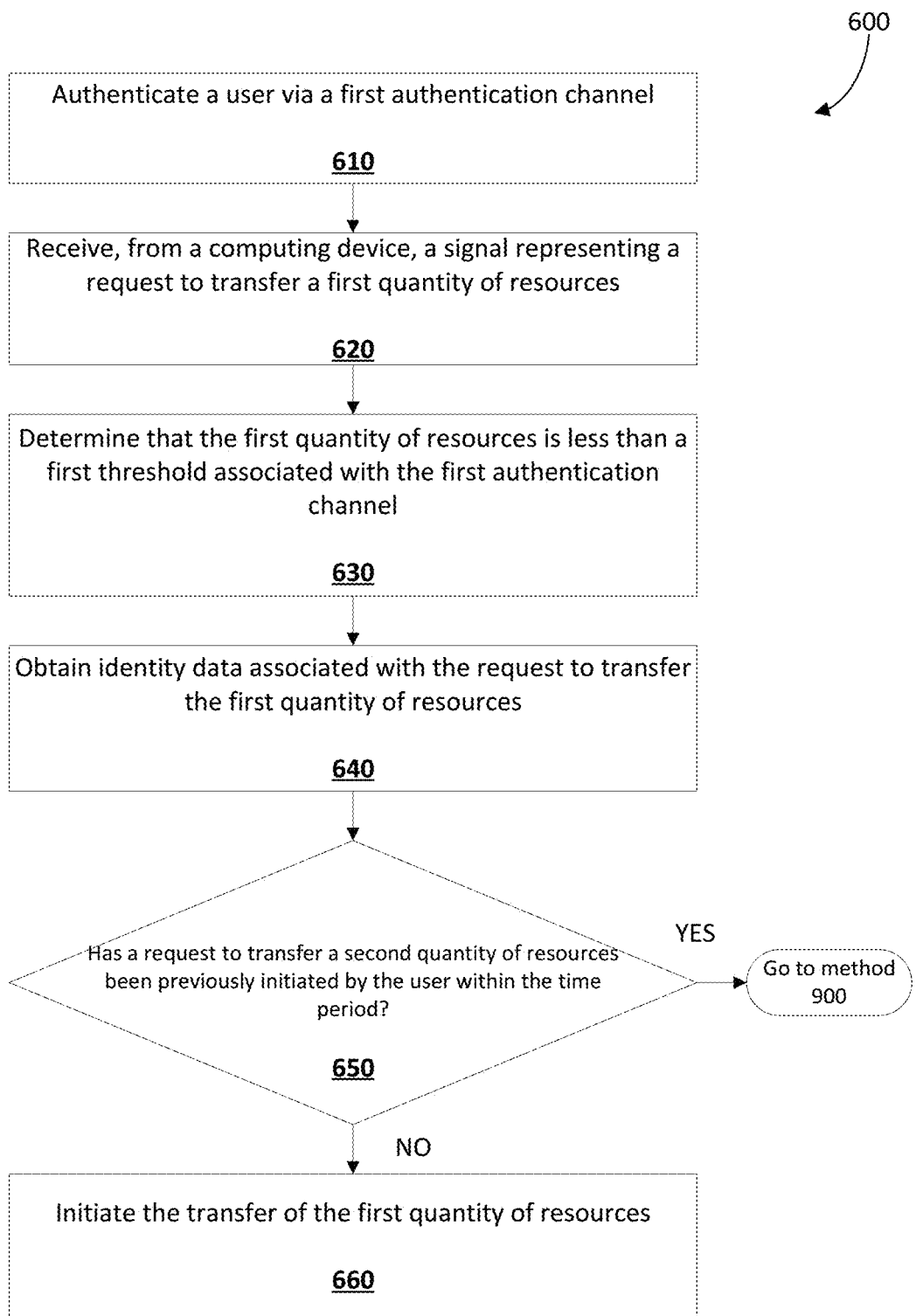
FIG. 6 is a flowchart showing operations performed by a server in initiating a transfer of resources according to an embodiment.

Embodiments of operations performed by the server 120 will now be described. FIG. 6 is a flowchart showing operations performed by the server 120 according to an embodiment. The operations may be included in a method 600 which may be performed by the server 120. For example, computer-executable instructions stored in memory of the server 120 may, when executed by one or more processors, configure the server 120 to perform the method 600 or a portion thereof.

The method 600 beings when the server 120 authenticates a user via a first authentication channel (step 610). The authentication may be performed using the computing device 110.

In this embodiment, the first authentication channel includes one of a direct authentication channel, an indirect authentication channel or an unauthenticated channel. As mentioned, the server 120 maintains a database that includes a threshold defining a quantity of resources that may be purchased using each particular authentication channel within a particular time period. In this embodiment, the time period may be a twenty-four (24) hour time period, a seven (7) day time period, a monthly time period or an annual time period.

The direct authentication channel authenticates the user directly with the server 120. The user is authenticated based on authorization information such as a secret (e.g., a password, a personal identification number, etc.), or other identifying data such as, for example, biometric data (a fingerprint, etc.). The authorization information is input by the user at the computing device 110 and a representation of the authorization information is provided to the server 120. The server 120 may access stored authorization data to validate the authorization information input by the user. The server 120 may determine that authentication is successful if the authorization information matches the stored authorization data. Once the user has been authenticated, the server 120 may obtain identity data of the user such as for example the user's name and address from memory.

In this embodiment, the user may authenticate via the direct authentication channel using GUI 500. Specifically, the user may enter their username, using the input interface associated with the computing device 110, into the first input field 510 and may enter their password, using the input interface associated with the computing device 110, into the second input field 520.

As mentioned, each authentication channel is associated with a threshold defining a quantity of resources that may be purchased using that particular authentication channel. Each threshold may be a dollar amount or a quantity amount of resources. In this embodiment, the direct authentication channel is associated with a first threshold which may be for example a $10,000 daily limit or may be for example a 10 Oz daily limit. The type of resource may be gold. As such, a user who has authenticated using the direct authentication channel may purchase or initiate the transfer of gold at a daily limit of $10,000. Alternatively, a user who has authenticated using the direct authentication channel may purchase or initiate the transfer of gold at a daily limit of 10 Oz.

The indirect authentication channel authenticates the user via the digital identity network associated with the digital identity network server 130. In this embodiment, the user may authenticate via the indirect authentication channel by selecting, using the input interface associated with the computing device 110, the first selectable option 530.

In response to the user selecting the first selectable option 530, the computing device 110 may be directed to an online application, which may be referred to as a digital ID web application. The digital ID web application may be configured to provide, to the computing device 110, a GUI. The GUI may include a selectable option for inputting a selection of an authentication provider. For example, the GUI may present a plurality of authentication providers and the user may be permitted to select an authentication provider, using the input interface associated with the computing device 110, for which they have previously registered. When input is received indicating that the user has selected an authentication provider, the computing device 110 is directed to an authentication provider system associated with the selected authentication provider. The selected authentication provider may be referred to as a digital asset provider. The authentication provider system may cause the computing device 110 to display a GUI that includes one of more input fields used to enter the authorization information. The GUI may be similar to GUI 500 described above.

The authentication provider system of the selected authentication provider may authenticate the user based on authorization information such as a secret (e.g., a password, a personal identification number, etc.), or other identifying data such as, for example, biometric data (a fingerprint, etc.).

Once the user has successfully authenticated using the authentication provider system of the selected authentication provider, the authentication provider system may send a signal to the digital identity network server 130 indicating that the user has successfully been authenticated. The digital identity network server 130 may send a signal to the server 120 indicating that the user has successfully been authenticated. In this manner, the server 120 may be referred to as a digital asset consumer. The signal indicating that the user has successfully been authenticated may include identity data such as the user's name, address, etc.

The indirect authentication channel may authenticate the user in a blind manner such that the digital asset provider (the selected authentication provider) does not know the identity of the digital asset consumer (the server 120) and the digital asset consumer (the server 120) does not know the identity of the digital asset provider (the selected authentication provider).

As mentioned, each authentication channel is associated with a threshold defining a quantity of resources that may be purchased using that particular authentication channel. Each threshold may be a dollar amount or a quantity amount of resources. In this embodiment, the indirect authentication channel is associated with a second threshold which may be equal to the first threshold. For example, the second threshold may be for example a $10,000 daily limit or may be for example a 10 Oz daily limit. The type of resource may be gold. As such, a user who has authenticated using the indirect authentication channel may purchase or initiate the transfer of gold at a daily limit of $10,000. Alternatively, a user who has authenticated using the indirect authentication channel may purchase or initiate the transfer of gold at a daily limit of 10 Oz.

The unauthenticated channel does not require the user to authenticate prior to initiating a request to transfer resources. For example, the user may choose to skip authentication and may only be required to enter their name and address to initiate the transfer of resources. Put another way, the unauthenticated channel does not require the user to input authorization information such as a username and a password.

In this embodiment, the user may initiate the transfer of resources without authenticating by selecting, via the input interface associated with the computing device 110, the second selectable option 540.

As mentioned, each authentication channel is associated with a threshold defining a quantity of resources that may be purchased using that particular authentication channel. Each threshold may be a dollar amount or a quantity amount of resources. In this embodiment, the unauthenticated channel is associated with a third threshold which may be less than the first threshold. For example, the third threshold may be for example a $3,000 daily limit or may be for example a 3 oz daily limit. The type of resource may be gold. As such, a user who has not authenticated (or has chosen to use the unauthenticated channel) may purchase or initiate the transfer of gold at a daily limit of $3,000. Alternatively, a user who has not authenticated (or has chosen to use the unauthenticated channel) may purchase or initiate the transfer of gold at a daily limit of 3 oz.

The server 120 receives, from computing device 110, a signal representing a request to transfer a first quantity of resources (step 620).

Figure 7:
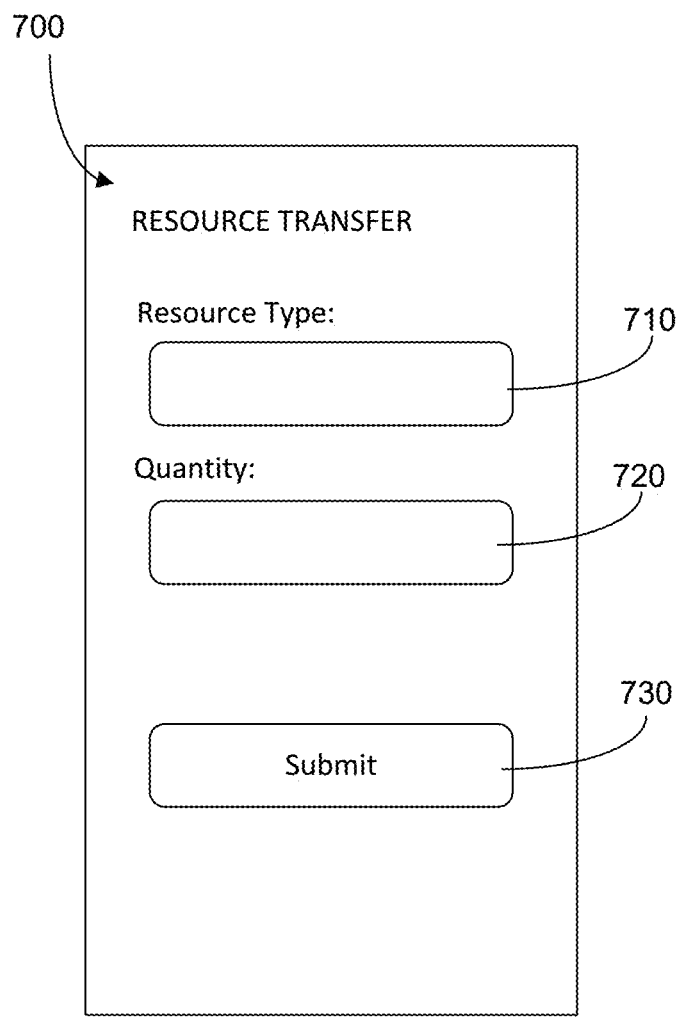
FIG. 7 is an example user interface according to an embodiment.

Once the user has authenticated via the first authentication channel, the server 120 may send a signal that causes a GUI 700 to be displayed on the computing device 110 as shown in FIG. 7. The GUI 700 includes a first input field 710 which is used to enter the type of resource the user would like to purchase or initiate a transfer of and a second input field 720 which is used to enter a quantity of resources the user would like to purchase or initiate the transfer of, which may be referred to as a first quantity of resources. The first input field 710 may be, for example, a drop down menu that displays a list of types of resources the user would like to purchase or initiate the transfer of. Alternatively, the first input field 710 may require the user to enter the name of the resource that the user would like to purchase or initiate the transfer of. The second input field 720 may require the user to enter the quantity of resources the user would like to purchase or initiate the transfer of. The quantity of resources may be a dollar amount or may be a weight (such as for example ounces, etc.) that the user would like to purchase or initiate the transfer of. The GUI 700 allows for manipulation of the input fields 710, 720 via the input interface associated with the computing device 110.

The GUI 700 includes a selectable option 730 which is used to submit the input entered into the input fields 710, 720. A touch gesture, for example, may be used to select the selectable option 730. In response to the user selecting the selectable option 730, a signal representing the request to transfer the first quantity of resources is sent from the computing device 110 to the server 120. The signal includes the type of resources and the first quantity of resources entered by the user in the input fields 710, 720.

In response to the user selection the selectable option 730, the server 120 may send a signal causing the computing device 110 to display a GUI that includes one or more input fields or selectable options regarding payment. For example, when the user has authenticated using direct authentication, the one or more input fields or selectable options may include payment using an account associated with the user or payment using a credit card of the user. When the user has authenticated using indirect authentication, the one or more input fields or selectable options may include payment using an account associated with the user (via the digital identity network associated with the digital identity network server 130) or payment using a credit card of the user. When the user has not authenticated (or has chosen to use the unauthenticated channel), one or more input fields or selectable options may include payment using a credit card. It will be appreciated that when the user wishes to pay using a credit card, the GUI may include one or more input fields for the user to enter their credit card information via the input interface associated with the computing device 110.

The server 120 determines that the first quantity of resources is less than a first threshold associated with the first authentication channel (step 630).

The server 120 compares the first quantity of resources to a threshold associated with the first authentication channel. As mentioned, each authentication channel is associated with a threshold defining a quantity of resources that may be purchased using that particular authentication channel.

When it is determined that the first quantity of resources is greater than the first threshold, the server 120 may send a signal to the computing device 110, the signal causing the computing device 110 to display a message indicating to the user that the first quantity of resources exceeds the first threshold and may prompt the user to enter a new quantity of resources.

When it is determined that the first quantity of resources is less than (or equal to) the first threshold, the server 120 continues to step 640. Specifically, the server 120 obtains identity data associated with the request to transfer the first quantity of resources (step 640). In this embodiment, the identity data includes the name of the user and an address of the user.

When the user has authenticated using the direct authentication channel, the server 120 obtains the identity data from a database.

As mentioned, when the user has authenticated using the indirect authentication channel, identity data may be sent by the digital asset provider to the digital identity network server 130. As such, when the user has authenticated using the indirect authentication channel, the server 120 obtains the identity data from the digital identity network server 130.

Figure 8:
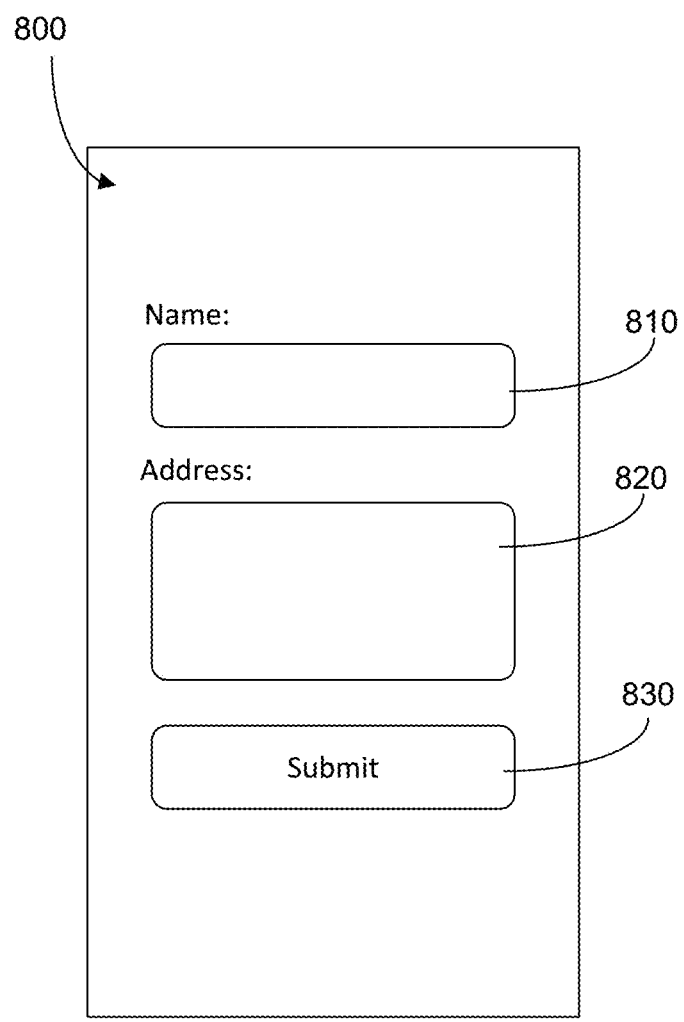
FIG. 8 is an example user interface according to an embodiment.

When the user has not authenticated (or has chosen to use the unauthenticated channel), the server 120 may send a signal to the computing device 110 that causes a GUI 800 to be displayed on the computing device 110, as shown in FIG. 8. As can be seen, the GUI 800 includes a first input field 810 which is used to enter the name of the user and a second input field 820 which is used to enter an address of the user. The address of the user may be a shipping address of the user. The GUI 800 allows for manipulation of the input fields 710, 720 via the input interface associated with the computing device 110.

The GUI 800 includes a selectable option 830 which is used to submit the identity data entered into the input fields 810, 820. A touch gesture, for example, may be used to select the selectable option 830. In response to the user selecting the selectable option 830, a signal representing the identity data is sent from the computing device 110 to the server 120. As such, the server 120 obtains the identity data.

The server 120 performs a check, based on the identity data, to determine if a request to transfer a second quantity of resources has been previously initiated by the user within the time period (step 650).

In this embodiment, the server 120 searches the database for data records that have been created within a particular time period, such as for example within the same day. Put another way, the server 120 searches the database for data records that may be relevant to the daily limit for transferring resources. Within the data records that have been created within the particular time period, the server 120 searches for data records that include at least some matching identity data to the obtained identity data. For example, the server 120 may search the database based on the user's name and/or address.

When the server 120 does not find any data records that include at least some matching identity data, the server 120 initiates the transfer of the first quantity of resources (step 660). To initiate the transfer of the first quantity of resources, the server 120 may process payment based on the user's account or credit card and may initiate obtaining and sending the first quantity of resources to the user based on the obtained identity data.

Figure 9:
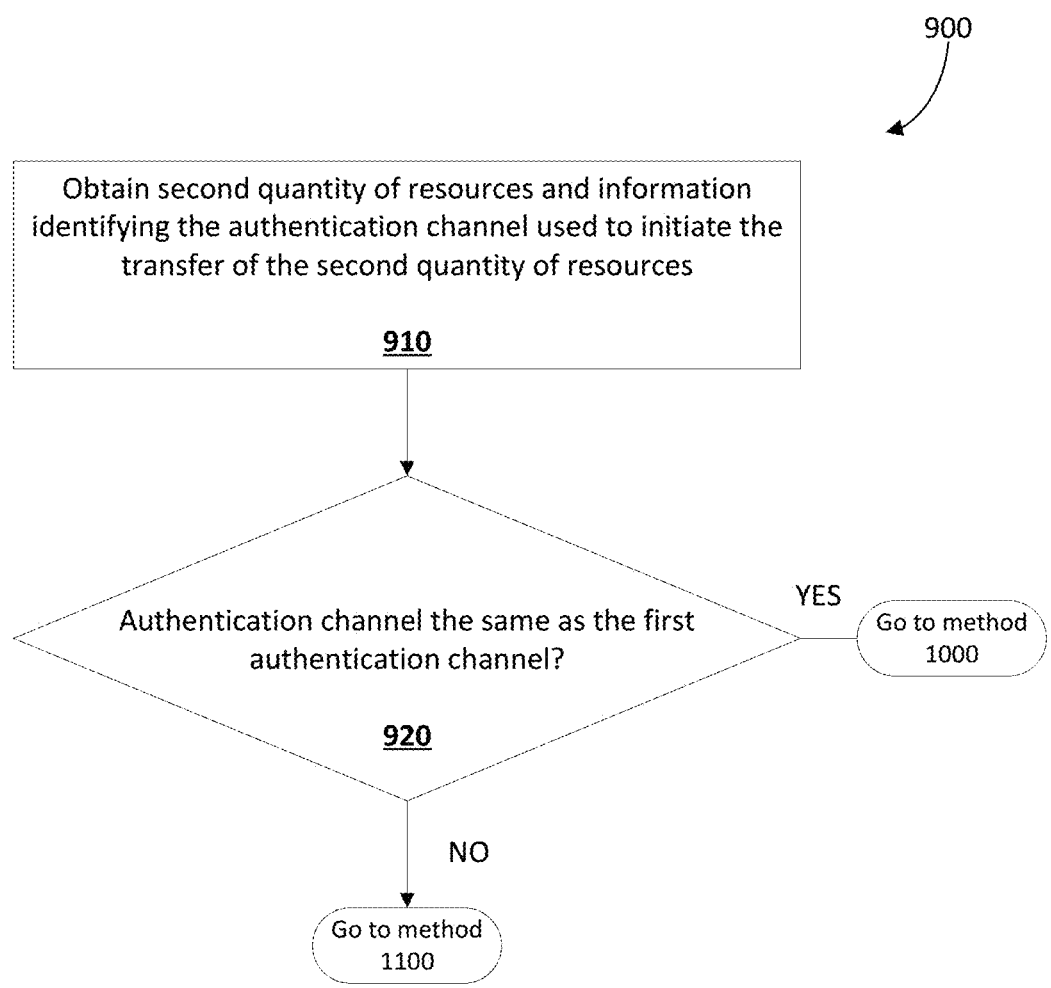
FIG. 9 is a flowchart showing operations performed by a server in determining if a second authentication channel is the same as a first authentication channel according to an embodiment.

When the server 120 finds one or more data records that include at least some matching identity data, that is, the identity data includes at least the same name and/or address, the server 120 continues to a method 900 shown in FIG. 9. The operations included in method 900 may be performed by the server 120. For example, computer-executable instructions stored in memory of the server 120 may, when executed by one or more processors, configure the server 120 to perform the method 900 or a portion thereof.

The server 120 obtains the quantity of resources stored in the one or more data records (which may be referred to as the second quantity of resources) that were previously initiated by the user within the time period. The server 120 also obtains information identifying the authentication channel used to initiate the transfer of the second quantity of resources. The authentication channel may be the direct authentication channel, the indirect authentication channel, or the unauthenticated channel (step 910).

The server 120 performs a check to determine if the authentication channel used to initiate the transfer of the second quantity of resources is the same as the first authentication channel (step 920). For example, the first authentication channel may be the direct authentication channel and as such the server 120 performs a check to determine if the authentication channel used to initiate the transfer of the second quantity of resources was also the direct authentication channel.

Figure 10:
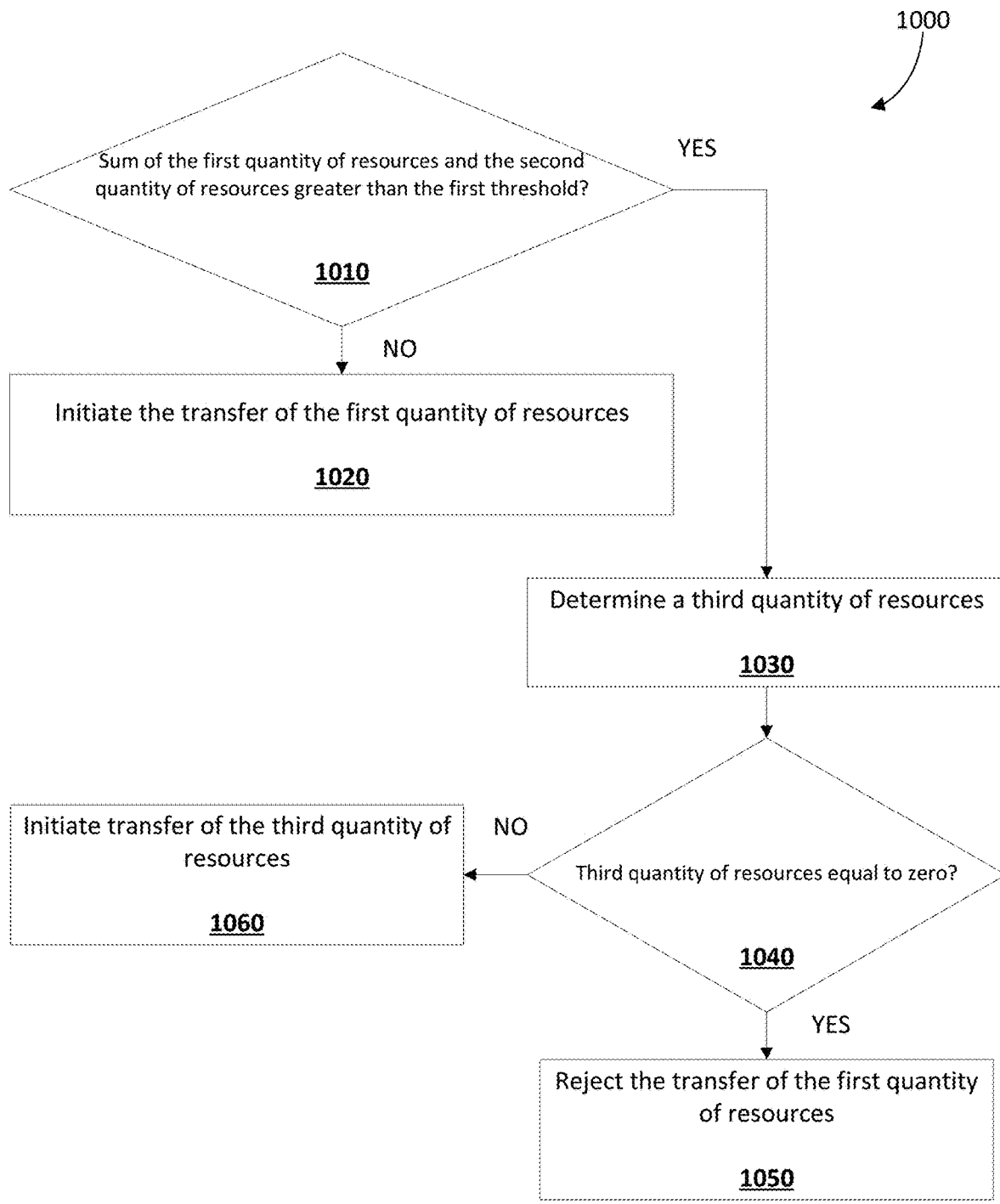
FIG. 10 is a flowchart showing operations performed by a server in initiating a transfer of resources according to an embodiment.

When the authentication channel used to initiate the transfer of the second quantity of resources is the same as the first authentication channel, the server 120 continues to a method 1000 shown in FIG. 10. The operations included in method 1000 may be performed by the server 120. For example, computer-executable instructions stored in memory of the server 120 may, when executed by one or more processors, configure the server 120 to perform the method 1000 or a portion thereof.

When the server 120 finds a data record, based on the identity data, that initiated a transfer of resources using the same authentication channel as the first authentication channel, the server 120 compares the sum of the first quantity of resources and the second quantity of resources to the first threshold (step 1010).

When the server 120 determines that the sum of the first quantity of resources and the second quantity of resources is less than (or equal to) the first threshold, the server 120 initiates the transfer of the first quantity of resources (step 1020).

To initiate the transfer of the first quantity of resources, the server 120 may process payment based on the user's account or credit card and may initiate obtaining and sending the first quantity of resources to the user based on the obtained identity data.

When the server 120 determines that the sum of the first quantity of resources and the second quantity of resources is greater than the first threshold, the server 120 determines a third quantity of resources that is determined as a difference between the first threshold and the second quantity of resources (step 1030).

The server 120 compares the third quantity of resources to zero (step 1040).

When the third quantity of resources is equal to zero, this indicates that the user has reached their daily limit for transferring resources and as such the request to transfer the first quantity of resources is rejected (step 1050). The server 120 may send, via the communications module and to the computing device 110, a signal causing the computing device 110 to display a notification indicating that the request cannot be completed as the user has reached the limit for that particular time period. The notification may also indicate a time when the user can initiate another request. For example, the notification may say "You have reached your daily limit. Please try again tomorrow."

When the third quantity of resources is not equal to zero, the server 120 initiates the transfer of the third quantity of resources (step 1060). Prior to initiating the transfer of the third quantity of resources, the server 120 may send, via the communications module and to the computing device 110, a signal causing the computing device 110 to display a notification indicating the third quantity of resources. The signal may cause the computing device 110 to display a prompt including selectable options that may be selected by the user to accept or reject transfer of the third quantity of resources. The transfer of the third quantity of resources may be initiated in response to the server 120 receiving a signal, via the communications module and from the computing device 110, indicating that the user has accepted the transfer.

To initiate the transfer of the third quantity of resources, the server 120 may process payment based on the user's account or credit card and may initiate obtaining and sending the third quantity of resources to the user based on the obtained identity data.

Figure 11:
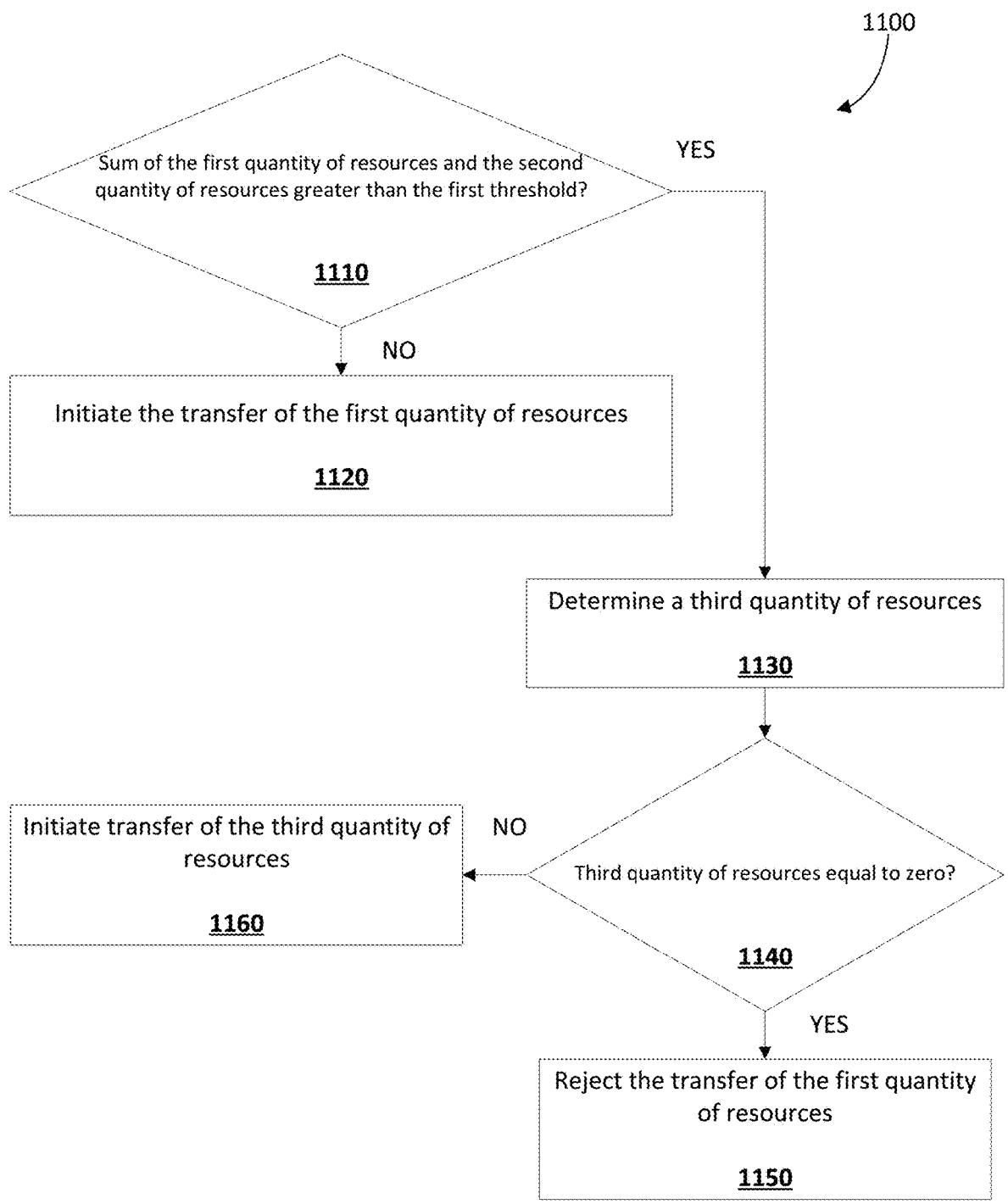
FIG. 11 is a flowchart showing operations performed by a server in initiating a transfer of resources according to an embodiment.

Referring back to FIG. 9, during step 920, when the authentication channel used to initiate the transfer of the second quantity of resources is different than the first authentication channel, the server 120 continues to a method 1100 shown in FIG. 11. The operations included in method 1100 may be performed by the server 120. For example, computer-executable instructions stored in memory of the server 120 may, when executed by one or more processors, configure the server 120 to perform the method 1100 or a portion thereof.

When the server 120 finds a data record, based on the identity data, that initiated a transfer of resources using a different authentication channel than the first authentication channel, the server 120 compares the sum of the first quantity of resources and the second quantity of resources to the first threshold (step 1110).

When the server 120 determines that the sum of the first quantity of resources and the second quantity of resources is less than (or equal to) the first threshold, the server 120 initiates the transfer of the first quantity of resources (step 1120).

To initiate the transfer of the first quantity of resources, the server 120 may process payment based on the user's account or credit card and may initiate obtaining and sending the first quantity of resources to the user based on the obtained identity data.

When the server 120 determines that the sum of the first quantity of resources and the second quantity of resources is greater than the first threshold, the server 120 determines a third quantity of resources that is determined as a difference between the first threshold and the second quantity of resources (step 1130).

The server 120 compares the third quantity of resources to zero (step 1140).

When the third quantity of resources is equal to zero, this indicates that the user has reached their daily limit for transferring resources and as such the request to transfer the first quantity of resources is rejected (step 1150). The server 120 may send, via the communications module and to the computing device 110, a signal causing the computing device 110 to display a notification indicating that the request cannot be completed as the user has reached the limit for that particular time period. The notification may also indicate a time when the user can initiate another request. For example, the notification may say "You have reached your daily limit. Please try again tomorrow."

When the third quantity of resources is not equal to zero, the server 120 initiates the transfer of the third quantity of resources (step 1160). Prior to initiating the transfer of the third quantity of resources, the server 120 may send, via the communications module and to the computing device 110, a signal causing the computing device 110 to display a notification indicating the third quantity of resources. The signal may cause the computing device 110 to display a prompt including selectable options that may be selected by the user to accept or reject transfer of the third quantity of resources. The transfer of the third quantity of resources may be initiated in response to the server 120 receiving a signal, via the communications module and from the computing device 110, indicating that the user has accepted the transfer.

To initiate the transfer of the third quantity of resources, the server 120 may process payment based on the user's account or credit card and may initiate obtaining and sending the third quantity of resources to the user based on the obtained identity data.

Figure 12:
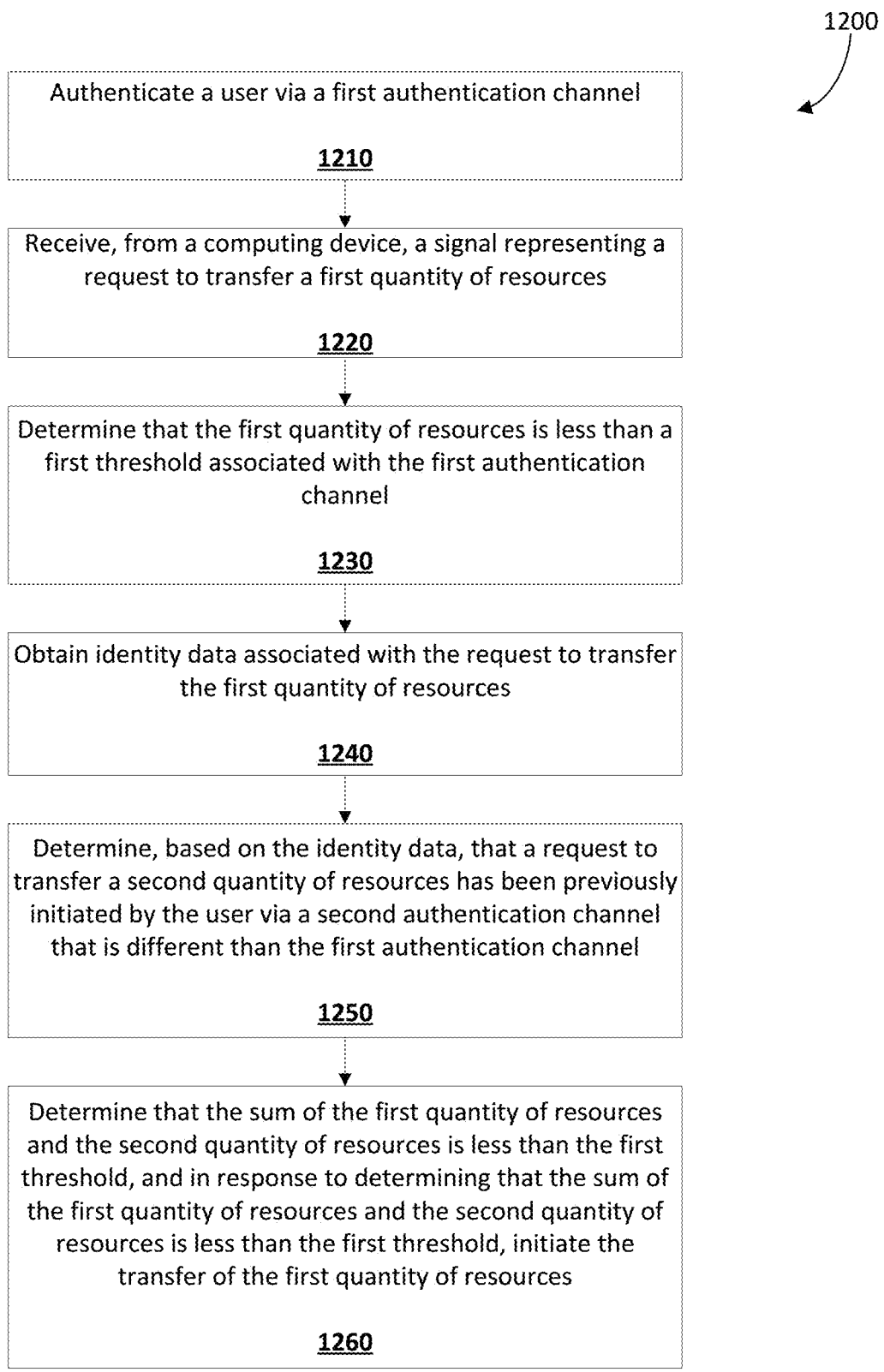
FIG. 12 is a flowchart showing operations performed by a server in initiating a transfer of resources according to an embodiment.

Another embodiment of operations performed by the server 120 will now be described. FIG. 12 is a flowchart showing operations performed by the server 120 according to an embodiment. The operations may be included in a method 1200 which may be performed by the server 120. For example, computer-executable instructions stored in memory of the server 120 may, when executed by one or more processors, configure the server 120 to perform the method 1200 or a portion thereof.

Steps 1210 to 1240 of method 1200 are generally identical to that of steps 610 to 640 of method 600, respectively.

Once identity data associated with the request to transfer the first quantity of resources is obtained (step 1240), the server 120

The server 120 determines, based on the identity data, that a request to transfer a second quantity of resources has been previously initiated by the user via a second authentication channel that is different than the first authentication channel (step 1250). In this embodiment, the server 120 searches the database for data records that have been created within a particular time period, such as for example within the same day. Put another way, the server 120 searches the database for data records that may be relevant to the daily limit for transferring resources. Within the data records that have been created within the particular time period, the server 120 searches for data records that include at least some matching identity data to the obtained identity data. For example, the server 120 may search the database based on the user's name and/or address.

When the server 120 finds one or more data records that include at least some matching identity data, that is, the identity data includes at least the same name and/or address, the server 120 obtains the quantity of resources stored in the one or more data records (which may be referred to as the second quantity of resources) that were previously initiated by the user within the time period. The server 120 also obtains information identifying the authentication channel used to initiate the transfer of the second quantity of resources. The authentication channel may be the direct authentication channel, the indirect authentication channel, or the unauthenticated channel.

The server 120 performs a check to determine if the authentication channel used to initiate the transfer of the second quantity of resources is the same as the first authentication channel. When it is determined that the authentication channel used to initiate the transfer of the second quantity of resources is different than the first authentication channel, the server 120 determines, based on the identity data, that a request to transfer a second quantity of resources has been previously initiated by the user via a second authentication channel that is different than the first authentication channel.

The server 120 determines that the sum of the first quantity of resources and the second quantity of resources is less than the first threshold, and in response to determining that the sum of the first quantity of resources and the second quantity of resources is less than the first threshold, initiates the transfer of the first quantity of resources (step 1260).

The server 120 compares the sum of the first quantity of resources and the second quantity of resources to the first threshold, that is, the threshold associated with the first authentication channel. In response to determining that the sum of the first quantity of resources and the second quantity of resources is less than the first threshold, the server 120 initiates the transfer of the first quantity of resources.

To initiate the transfer of the first quantity of resources, the server 120 may process payment based on the user's account or credit card and may initiate obtaining and sending the first quantity of resources to the user based on the obtained identity data.

In the above embodiments, each time request to transfer a quantity of resources is initiated, the server 120 stores a data record of the request in the database. The data record may include a quantity (amount and/or value) of the resources, a type of the resources, identity data associated with a customer or user purchasing or requesting transfer of the resources, and information indicating an authentication channel used to initiate the transfer of resources. Using the above described embodiments, the server 120 ensures that user's have not exceeded their limit of transferring or purchasing resources by initiating the transfer of resources or purchasing resources using different authentication channels.

Although in embodiments identity data is described as including a user's name and address, it will be appreciated that additional or alternative types of identity data may be included. For example, a user's account number or credit card number may be included as identity data.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted certain adaptations and modifications of the described embodiments can be made. Therefore, the above discussed embodiments are considered to be illustrative and not restrictive.

What is claimed is:

1. A server comprising:
   a communications module;
   a processor coupled with the communications module; and
   a memory coupled to the processor and storing processor-executable instructions which, when executed by the processor, configure the processor to:
   authenticate a user via a first authentication channel;
   receive, via the communications module and from a computing device associated with the user, a signal representing a request to transfer a first quantity of resources;
   determine that the first quantity of resources is less than a first threshold associated with the first authentication channel;
   responsive to determining that the first quantity of resources is less than the first threshold associated with the first authentication channel, obtain identity data associated with the request to transfer the first quantity of resources, the identity data including at least a shipping address of the user;
   determine, based on the identity data, that a request to transfer a second quantity of resources has been previously initiated by the user via a second authentication channel that is different than the first authentication channel, the second authentication channel including an indirect authentication channel that comprises authenticating the user via a digital identity network; and
   determine that the sum of the first quantity of resources and the second quantity of resources is less than the first threshold, and in response to determining that the sum of the first quantity of resources and the second quantity of resources is less than the first threshold, initiate the transfer of the first quantity of resources.

2. The server of claim 1, wherein the first authentication channel includes a direct authentication channel that comprises authenticating the user based on a username and password.

3. The server of claim 2, wherein the second authentication channel does not require the username and password.

4. The server of claim 1, wherein the second authentication channel includes an unauthenticated channel that does not require authenticating the user.

5. The server of claim 1, wherein the processor-executable instructions, when executed by the processor, further configure the processor to:
determine that the sum of the first quantity of resources and the second quantity of resources exceeds the first threshold, and in response to determining that the sum of the first quantity of resources and the second quantity of resources exceeds the first threshold, initiate a transfer of a third quantity of resources that is determined as a difference between the first threshold and the second quantity of resources.

6. The server of claim 5, wherein the processor-executable instructions, when executed by the processor, further configure the processor to:
send, via the communications module and to the computing device, a signal causing the computing device to display a notification indicating the third quantity of resources.

7. The server of claim 6, wherein the signal causes the computing device to display a prompt requesting the user to accept or reject transfer of the third quantity of resources and wherein the transfer of the third quantity of resources is initiated in response to receiving a signal, via the communications module and from the computing device, indicating that the user has accepted the transfer.

8. The server of claim 1, wherein the processor-executable instructions, when executed by the processor, further configure the processor to:
determine that the second quantity of resources exceeds the first threshold, and in response to determining that the second quantity of resources exceeds the first threshold, reject the transfer of the first quantity of resources.

9. The server of claim 1, wherein the second authentication channel is associated with a second threshold that is different than the first threshold.

10. A computer-implemented method comprising:
authenticating a user via a first authentication channel;
receiving, via a communications module and from a computing device associated with the user, a signal representing a request to transfer a first quantity of resources;
determining that the first quantity of resources is less than a first threshold associated with the first authentication channel;
responsive to determining that the first quantity of resources is less than the first threshold associated with the first authentication channel, obtaining identity data associated with the request to transfer the first quantity of resources, the identity data including at least a shipping address of the user;
determining, based on the identity data, that a request to transfer a second quantity of resources has been previously initiated by the user via a second authentication channel that is different than the first authentication channel, the second authentication channel including an indirect authentication channel that comprises authenticating the user via a digital identity network; and
determining that the sum of the first quantity of resources and the second quantity of resources is less than the first threshold, and in response to determining that the sum of the first quantity of resources and the second quantity of resources is less than the first threshold, initiating the transfer of the first quantity of resources.

11. The computer-implemented method of claim 10, wherein the first authentication channel includes a direct authentication channel that comprises authenticating the user based on a username and password.

12. The computer-implemented method of claim 11, wherein the second authentication channel does not use the username and password.

13. The computer-implemented method of claim 10, wherein the second authentication channel includes an unauthenticated channel that does not require authenticating the user.

14. The computer-implemented method of claim 10, further comprising:
determining that the sum of the first quantity of resources and the second quantity of resources exceeds the first threshold, and in response to determining that the sum of the first quantity of resources and the second quantity of resources exceeds the first threshold, initiating a transfer of a third quantity of resources that is determined as a difference between the first threshold and the second quantity of resources.

15. The computer-implemented method of claim 14, further comprising:
sending, via the communications module and to the computing device, a signal causing the computing device to display a notification indicating the third quantity of resources.

16. The computer-implemented method of claim 15, wherein the signal causes the computing device to display a prompt requesting the user to accept or reject transfer of the third quantity of resources and wherein the transfer of the third quantity of resources is initiated in response to receiving a signal, via the communications module and from the computing device, indicating that the user has accepted the transfer.

17. The computer-implemented method of claim 10, further comprising:
determining that the second quantity of resources exceeds the first threshold, and in response to determining that the second quantity of resources exceeds the first threshold, rejecting the transfer of the first quantity of resources.

18. A non-transitory computer readable storage medium comprising computer-executable instructions which, when executed, configure a processor to:
authenticate a user via a first authentication channel;
receive, via a communications module and from a computing device associated with the user, a signal representing a request to transfer a first quantity of resources;
determine that the first quantity of resources is less than a first threshold associated with the first authentication channel;
responsive to determining that the first quantity of resources is less than the first threshold associated with the first authentication channel, obtain identity data associated with the request to transfer the first quantity of resources, the identity data including at least a shipping address of the user;

determine, based on the identity data, that a request to transfer a second quantity of resources has been previously initiated by the user via a second authentication channel that is different than the first authentication channel, the second authentication channel including an indirect authentication channel that comprises authenticating the user via a digital identity network; and determine that the sum of the first quantity of resources and the second quantity of resources is less than the first threshold, and in response to determining that the sum of the first quantity of resources and the second quantity of resources is less than the first threshold, initiate the transfer of the first quantity of resources.

* * * * *